US009204763B1

(12) United States Patent
Laberda

(10) Patent No.: US 9,204,763 B1
(45) Date of Patent: Dec. 8, 2015

(54) SHOWER PEDESTALS

(71) Applicant: Mark Laberda, Brooklyn Park, MN (US)

(72) Inventor: Mark Laberda, Brooklyn Park, MN (US)

( * ) Notice: Subject to any disclaimer, the term of this patent is extended or adjusted under 35 U.S.C. 154(b) by 0 days.

(21) Appl. No.: 14/686,757

(22) Filed: Apr. 14, 2015

Related U.S. Application Data

(60) Provisional application No. 61/979,342, filed on Apr. 14, 2014.

(51) Int. Cl.
| | |
|---|---|
| *A47K 3/024* | (2006.01) |
| *A47K 3/00* | (2006.01) |
| *A47K 3/12* | (2006.01) |
| *F16B 47/00* | (2006.01) |
| *A47K 3/28* | (2006.01) |

(52) U.S. Cl.
CPC ................. *A47K 3/125* (2013.01); *A47K 3/281* (2013.01); *F16B 47/00* (2013.01)

(58) Field of Classification Search
CPC ............................... A47K 3/125; A47K 3/281

USPC ............ 4/571.1, 574.1, 578.1, 579, 594, 605, 4/611
See application file for complete search history.

(56) References Cited

U.S. PATENT DOCUMENTS

| | | | |
|---|---|---|---|
| 4,498,204 A * | 2/1985 | Warner .............................. 4/559 |
| 5,647,072 A * | 7/1997 | Shaffer et al. ................... 4/574.1 |
| 5,724,894 A * | 3/1998 | Knorovsky ...................... 108/42 |
| 2006/0143821 A1* | 7/2006 | Matthews ......................... 4/611 |
| 2007/0029327 A1* | 2/2007 | Belokin et al. ................. 220/483 |

* cited by examiner

*Primary Examiner* — Huyen Le
*Assistant Examiner* — Christine Skubinna
(74) *Attorney, Agent, or Firm* — Underwood & Associates, LLC

(57) ABSTRACT

Pedestal systems are disclosed that provide a platform onto which a user can place a foot so as to elevate the leg for ease in shaving and other hygienic functions. For example, a pedestal system can include at least one vertically-oriented, elongate beam member coupled with a perpendicularly-coupled shelf member configured to receive the foot of a user, and one or more coupling mechanisms configured to reversibly couple at least one of the elongate beam members and the shelf member to a structural component such as a wall or floor of a bathtub or shower.

3 Claims, 7 Drawing Sheets

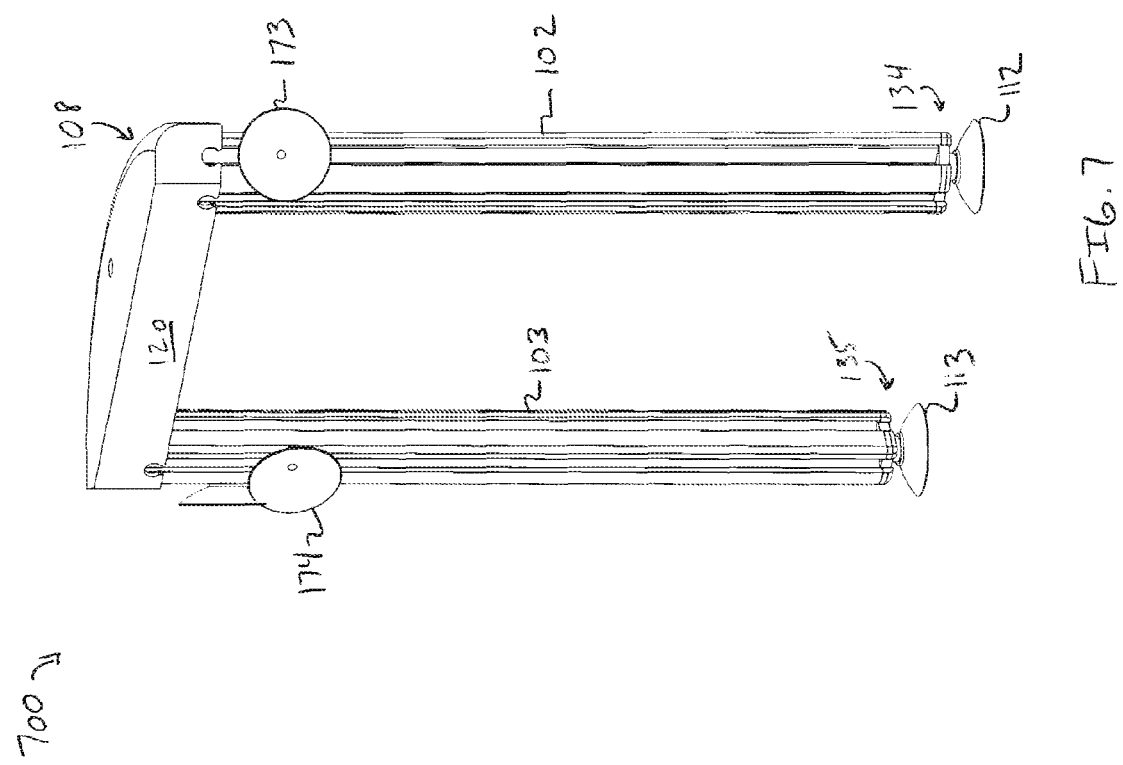

SHOWER PEDESTALS

CROSS REFERENCE TO RELATED APPLICATIONS

This application claims priority to and the benefit under 35 USC §119(e) of U.S. Provisional Patent Application No. 61/979,342, filed on Apr. 14, 2014, the contents of which are incorporated by reference in their entirety as if fully set forth herein.

TECHNICAL FIELD

This disclosure relates to pedestal structures for use in showers, bathtubs, and similar facilities. Specifically, this disclosure relates to pedestal structures configured to provide a footrest which elevates the leg for easier shaving and other hygienic functions.

BACKGROUND

Some people prefer to perform hygiene functions such as shaving in the shower, in part because it provides an easy way to rinse off shaving creams or lotions, and also because the steam generated by the shower or bath can contribute to softening of hair and skin, leading to a smooth shave.

For some people, performing such functions can be painful, burdensome, or difficult due to various types of disabilities, loss of balance control, injury or other reasons. Furthermore, persons having recently had a surgical procedure may find it difficult to shave their legs due to weakness, pain, discomfort or other reasons. Performing basic hygienic functions like shaving legs, painting toenails, and other activities can benefit such patients at least psychologically, especially if their recovery in a hospital will be more than two or three days.

SUMMARY

In general, pedestal structures are disclosed. In one exemplary aspect, a pedestal structure includes one or more pedestal members coupled to a support structure. The support structure can be configured to couple to a wall of a bathtub, shower, or similar facility. The one or more pedestal members can provide a place on which a user can place their foot, so that their leg is correspondingly elevated, to ease the process of shaving, pedicuring, and other processes.

In one exemplary aspect, a pedestal system is disclosed. The pedestal system includes at least one vertically-oriented, elongate beam member coupled with a perpendicularly-coupled shelf member configured to receive the foot of a user, and one or more coupling mechanisms configured to reversibly couple at least one of the elongate beam member and the shelf member to a structural component of a bathtub or shower.

In one embodiment, the shelf member is substantially D-shaped. In a related embodiment, the substantially D-shaped shelf member includes a flat rear portion having proximal and distal end portions, an arcuate front portion, and a faceted portion adjacent to each of the proximal and distal end portions. In a related embodiment, the faceted portions are disposed on planes that intersect at approximately ninety degrees. In one embodiment, each of faceted portions comprise a coupling mechanism configured for reversibly coupling the shelf member to a wall. In one embodiment, the coupling mechanism is a suction cup. In one embodiment, the rear flat portion includes one or more coupling mechanisms for reversibly coupling the shelf member to a wall. In one embodiment, the flat rear portion includes an elongate slot configured for receiving one or more of the coupling members and providing selective placement thereof along the elongate slot. In one embodiment, the elongate beam member includes a first elongate slot along a first beam member facet configured for receiving one or more of the coupling members and providing selective placement thereof along the first elongate slot. In one embodiment, the pedestal system further includes a second elongate slot along a second, different beam member facet configured for receiving one or more of the coupling members and providing selective placement thereof along the elongate second elongate slot. In one embodiment, the angle between the first and the second beam member facets is substantially equivalent to the angle between the faceted portion and the flat rear portion of the D-shaped shelf member.

In one embodiment, the one or more coupling mechanisms are configured to be selectively positionable to provide the capability of coupling the elongate beam member to a wall that is non-parallel with the long axis of the beam member.

In one embodiment, the elongate beam member is configured to provide adjustable height of the shelf member.

In one embodiment, the pedestal system is configured for use in a bathtub or shower.

In one exemplary aspect, a method for providing a foot pedestal is provided. The method includes providing an elongate beam member and providing a substantially D-shaped shelf member configured to receive the foot of a user. In this method, the elongate beam member and the shelf member are configured to be reversibly coupled in a substantially perpendicular orientation; furthermore, at least one of the elongate beam member and the shelf member comprise a slot or aperture for receiving a coupling member for reversibly coupling the foot pedestal to a shower or bathtub wall.

In one embodiment, the slot or aperture is elongate and includes a plurality of mini-channels extending therefrom, wherein each of the mini-channels is configured to receive one of the coupling members.

In one embodiment, the method further includes providing a collar on an underside of the shelf member configured to receive an end portion of the elongate beam member to provide engagement therebetween.

In one exemplary aspect, a foot pedestal configured for use in a shower or bathtub is disclosed. The foot pedestal includes an elongate beam member, a substantially D-shaped shelf member configured to couple to an end portion of the elongate beam member on an underside, and a slot for selectively positioning a coupling member on the D-shaped shelf member that provides the capability of coupling the foot pedestal to a wall of the shower or bathtub.

In one embodiment, the substantially D-shaped shelf member includes a flat rear portion having proximal and distal end portions, an arcuate front portion, and a faceted portion adjacent to each of the proximal and distal end portions.

In one embodiment, the faceted portions are disposed on planes that intersect at approximately ninety degrees.

Certain advantages of the systems and methods include providing ease in shaving. For example, a pedestal structure of the type described herein can elevate a user's leg so that reaching or stretching to access distal portions of the leg, e.g., the ankle is reduced. The systems and methods described herein can be particularly advantageous for persons suffering from limited range of motion, lack of flexibility, obesity, or other health problems. Similarly, pedestal systems of the type described herein can be advantageous to those who have recently undergone a surgical procedure that has resulted in reduced flexibility or range of motion, e.g., during the healing period. In yet another advantage, the disclosed pedestal systems can be coupled to a bathtub or shower wall in a chosen location, and can be easily removed for storage. Other advantages will be apparent from the drawings, the following description, and the claims.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which:

FIG. 7 is a side-isometric view of a pedestal system according to one embodiment.

DETAILED DESCRIPTION OF ILLUSTRATIVE EMBODIMENTS

In one exemplary aspect, pedestal systems are described. In general, the disclosed pedestal systems provide a prop onto which a user can place their foot to generally elevate their leg for shaving and other hygienic functions. Various pedestal system embodiments can be configured such that they can be reversibly coupled to a shower or bathtub surface, such as a wall, in a desired orientation and location. Furthermore, in various embodiments, the pedestals can be maneuverable to allow the user to customize their configuration to best suit their needs. In general, the disclosed pedestal systems can be particularly beneficial to persons suffering from health ailments such as obesity, arthritis, vertigo, or other ailments that may make hygienic functions like shaving their legs difficult. Such systems can also be beneficial in hospital settings, where patients are recovering from surgeries or other procedures that would make bending over to reach distal portions of the leg difficult or dangerous.

Figure 1:
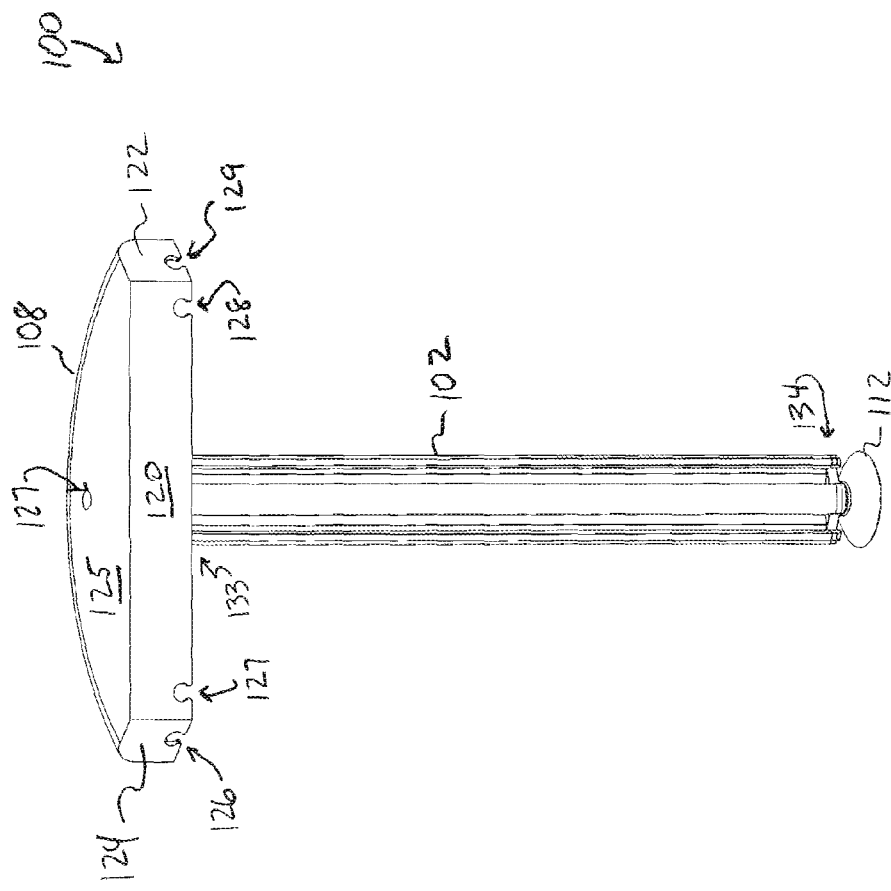
FIG. 1 is a front-isometric view of a pedestal system according to one embodiment.

Referring now to FIGS. 1-4, a pedestal system 100 is shown in various views according to one embodiment. FIG. 1 shows the pedestal system 100 in a front-isometric view. In this embodiment, the system 100 includes a vertically-oriented, elongate beam member 102 coupled to a horizontally-oriented shelf member 108. In this embodiment, the beam member 102 and the shelf member 108 can be formed of plastic, metal, or any other material or combinations of materials suitable for use in wet or humid environments, as would be expected in a shower or bathtub facility, for example. In this embodiment, the shelf member 108 is coupled to a proximal end portion 133 of the beam member 102 using a bolt 127, however, any other coupling mechanism can be substituted according to preference, aesthetic value, function, or other aspects.

In this embodiment, the system 100 is configured to reversibly couple to various surfaces encountered in bathtub, shower, or combination bathtub/shower facilities. In this embodiment, the system 100 can be coupled to such surfaces through the use of one or more coupling mechanisms. The embodiment of FIGS. 1-4 illustrates the use of suction cups for coupling the system 100 to bathtub or shower surfaces. For example, beam member 102 includes a suction cup 112 disposed on a distal end portion 134 as illustrated which can be used to couple the lower portion of the system 100 to a bathtub or shower floor.

Figure 2:
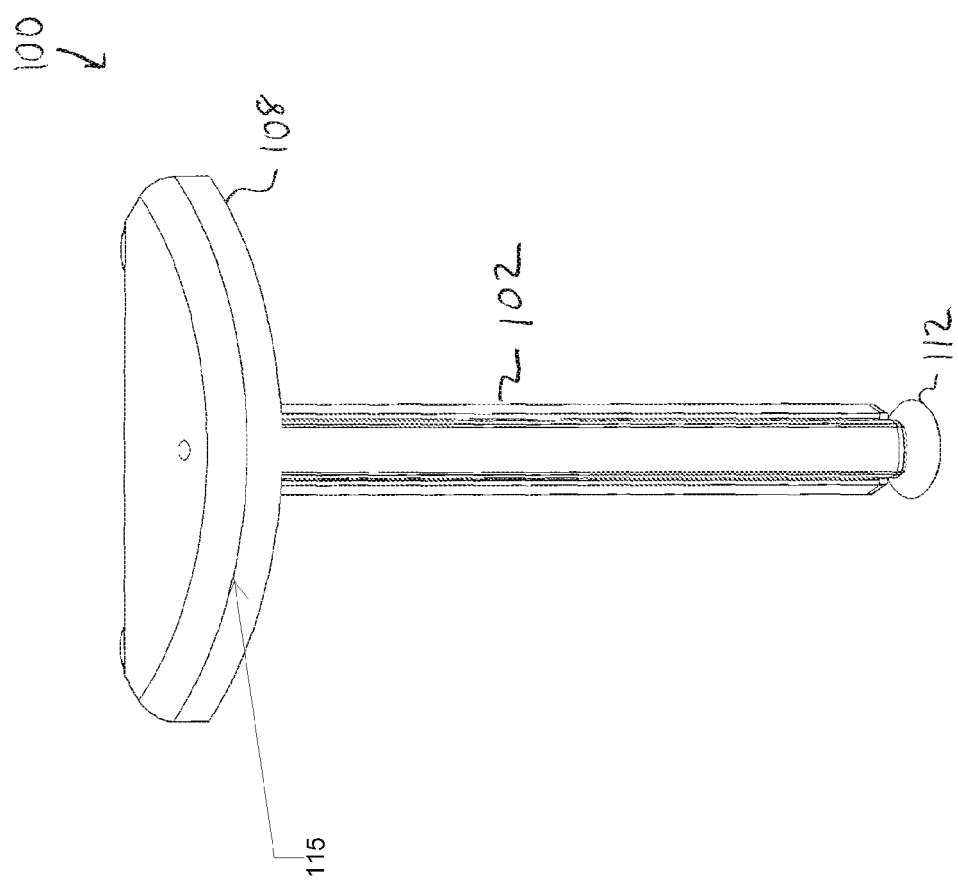
FIG. 2 is a rear-isometric view of the pedestal system illustrated in FIG. 1.
Figure 3:
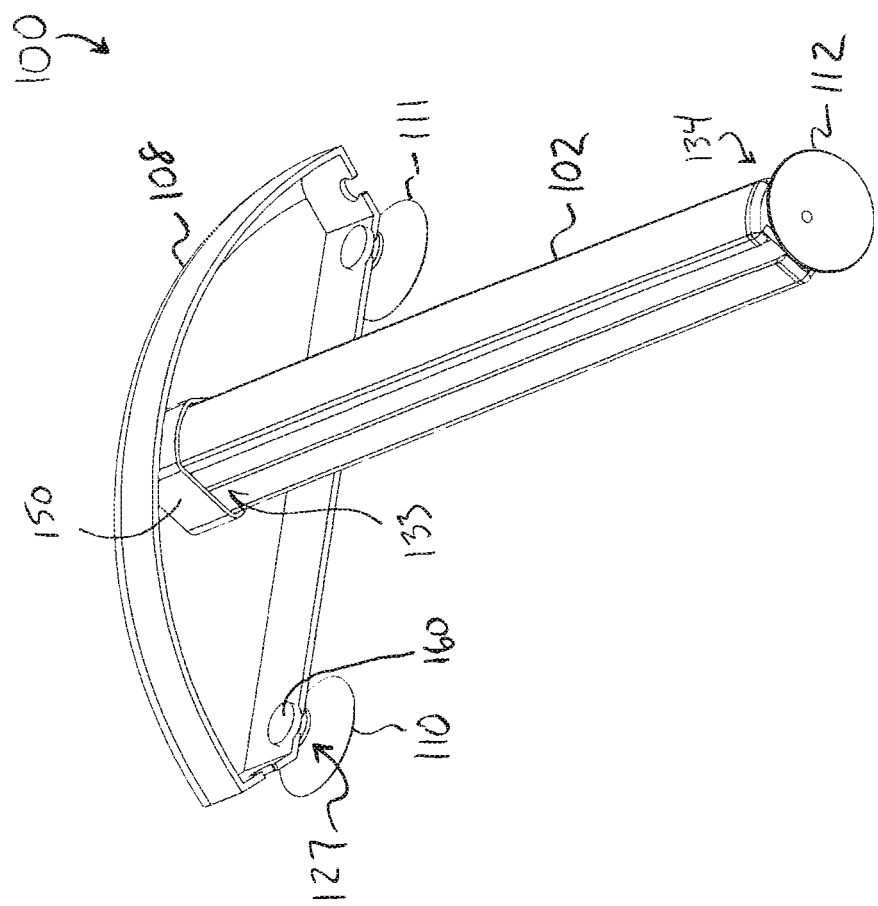
FIG. 3 is a bottom-to-top isometric view of the pedestal system illustrated in FIG. 1.
Figure 4:
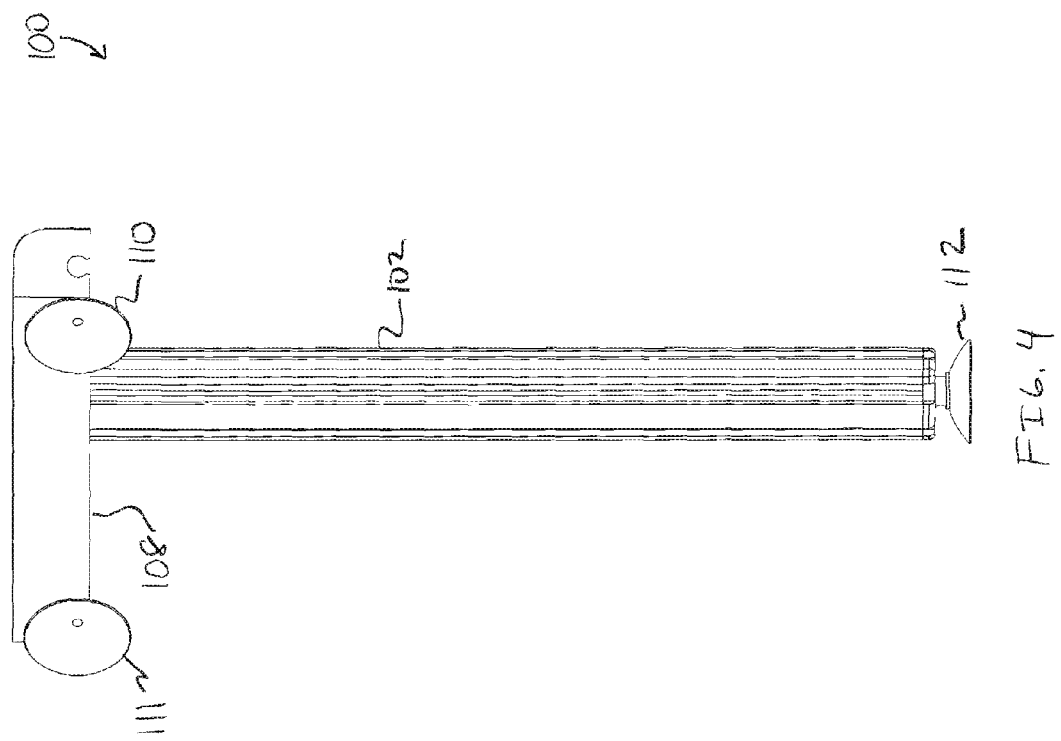
FIG. 4 is a right elevational view of the pedestal system illustrated in FIG. 1.

Referring in part to FIG. 2, in this embodiment, shelf member 108 is substantially "D" shaped; having a flat, rear surface 120 flanked by two facet portions 122, 124, respectively, and an arcuate front surface 115 that spans both facet portions 122, 124 on an opposite side of the flat surface 120 as illustrated. It should be understood that the D-shape of the shelf member 108 is one of many possible shapes. In this embodiment, each of the flat surface 120 and the facet portions 122, 124 include a slot for reversibly engaging a post member of a suction cup. For example, flat surface 120 includes slots 127, 128; facet portion 122 includes slot 129; and facet portion 124 includes slot 126. FIG. 2 illustrates an exemplary suction cup 110 having a post member 160 that is reversibly engaged to slot 127. Suction cups 110 and 111 are absent in FIG. 1 for clarity of illustration. It should be understood that the position and number of the various slots—and correspondingly, the position and number of suction cups—can be modified from that shown in FIG. 1 to achieve desired results.

In this embodiment, an underside of the shelf member 108 includes a protruding collar member 150 configured to receive the proximal end portion 133 of the beam member 102. Collar member 150 can protrude outwardly a desired distance to provide a desired amount of coupling security between the two members. In this embodiment, the opening of the collar member 150 is configured to frictionally engage the end portion 133 with a minimum of space therebetween.

Figure 5:
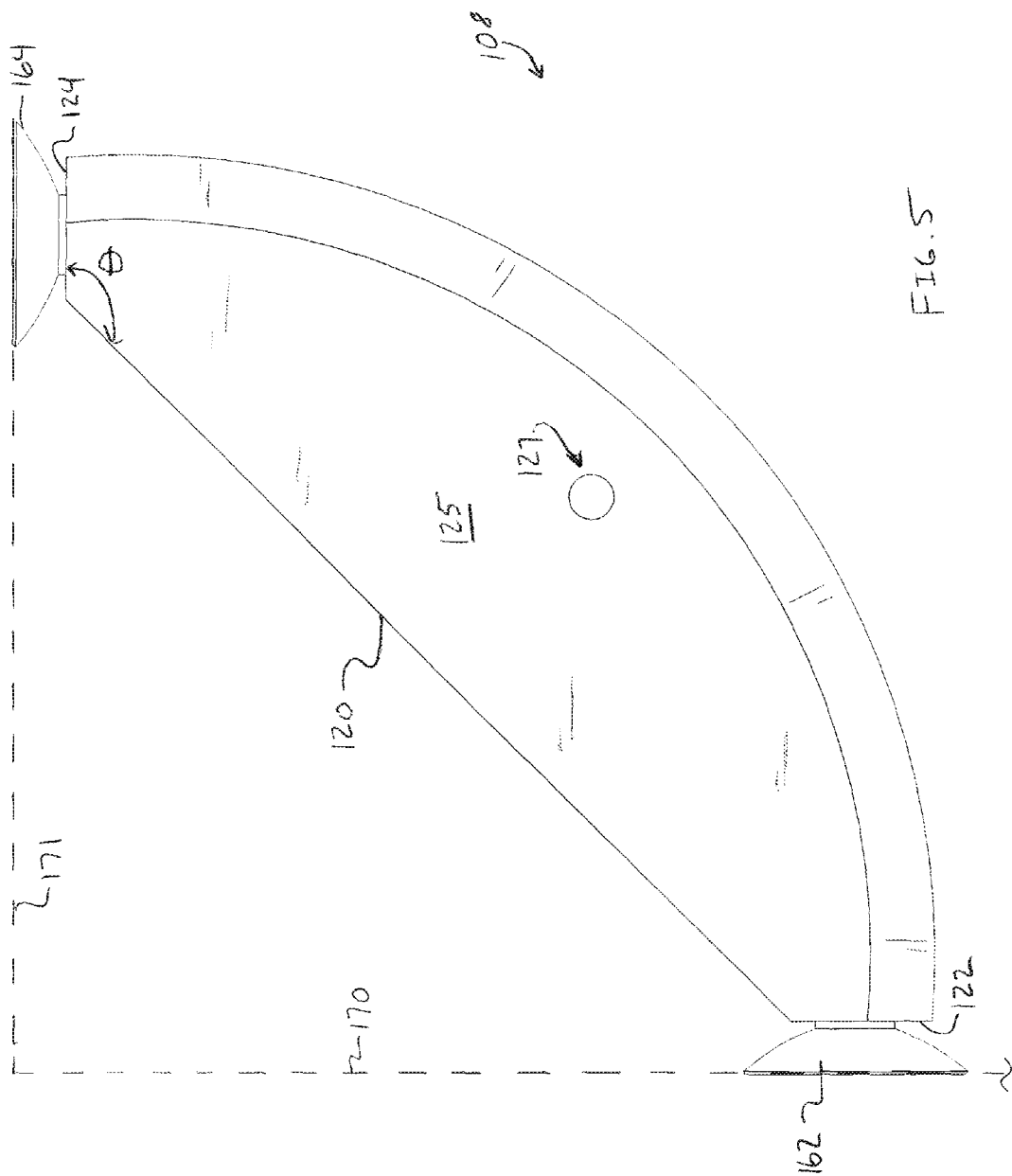
FIG. 5 is a top plan view of a shelf member according to one embodiment.

Referring now to FIG. 5, a top view of the system 100 is shown. In this embodiment, facet portions 122 and 124 of the shelf member 108 are configured to be substantially perpendicular to each other as illustrated; e.g., facet portion 122 and facet portion 124 are disposed on planes that intersect at approximately ninety degrees. Such a configuration provides the capability to install the system 100 in the corner of two intersection walls 170, 171, which are illustrated as dashed lines in FIG. 5 and are not part of the system 100. In other embodiments, the facet portions can be at different angles θ with respect to surface 120 to accommodate placement in a variety of shower or tub wall configurations. In this and other embodiments, the one or more suction cups, e.g., suction cups 162, 164 can be rotatable to accommodate various wall surface features or geometric configurations.

In this and other embodiments, shelf member 108 can include various types of gripping or anti-slip features to reduce the likelihood of a person's foot slipping from the shelf. For example, the top surface 125 of the shelf member 108 can include ridges, channels, protrusions, and other features configured to reduce slippage. Likewise, top surface 125 can be coated with an anti-slip membrane or other material.

Figure 6:
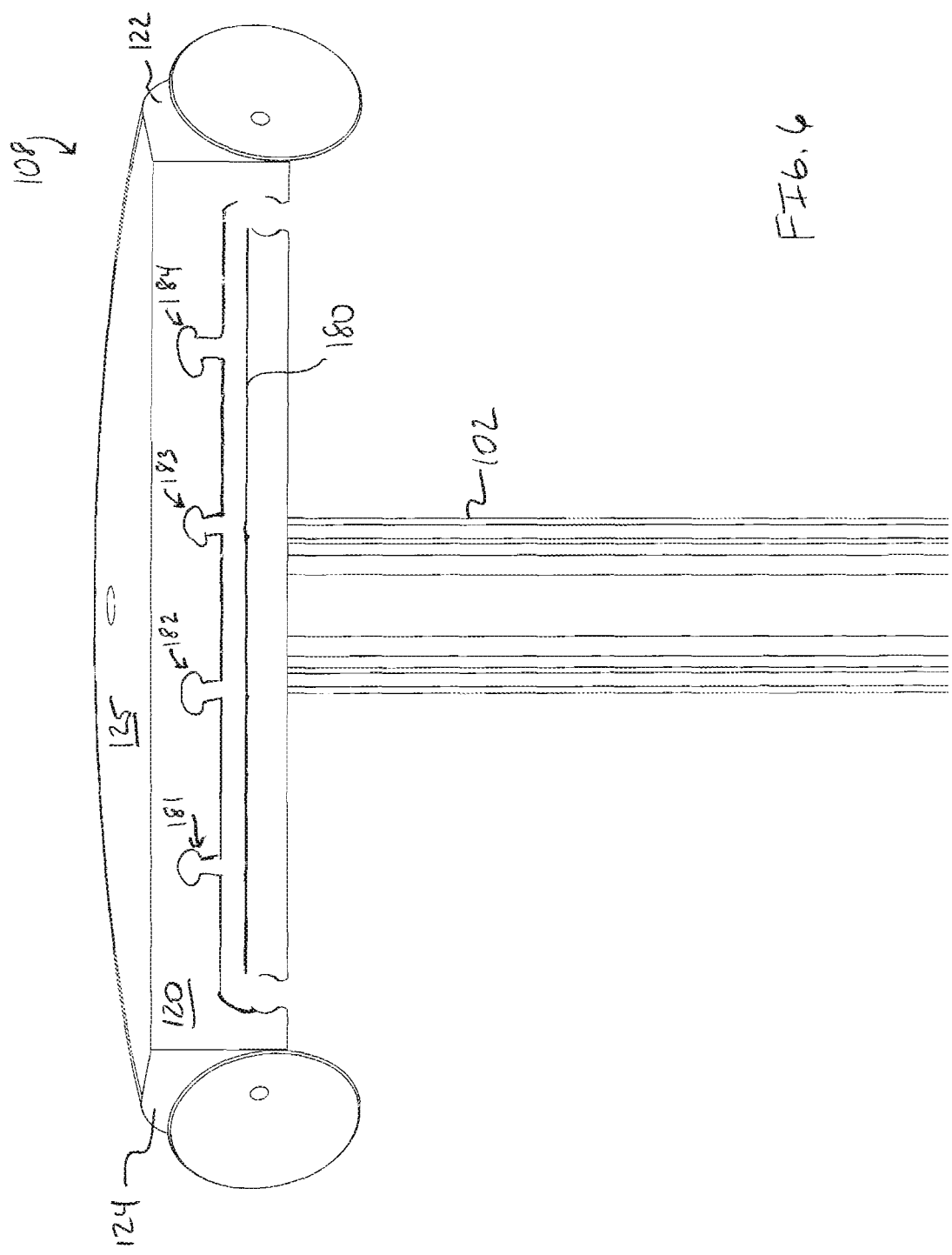
FIG. 6 is a front elevation view of a shelf member according to one embodiment.

Referring now to FIG. 6, shelf member 108 is shown according to one alternative embodiment. In recognition of the wide variety of shower and tub configurations, e.g., tile sizes, grout lines, etc., in this embodiment, the shelf member 108 includes an elongate slot 180 in surface 120 to accommodate selectable placement of one or more suction cup members. For example, a suction cup can be translated and disposed anywhere along the slot 180; or, if necessary, a suction cup can be shifted toward surface 125 into one of a plurality of mini-channels 181, 182, 183, 184. In this embodiment, slot 180 and each of the mini-channels 181-184 are configured to fix a suction cup in a desired location by friction, as the slot widths are slightly less than the width of the post member 160. As such, slot 180 and, in some embodiments, the plurality of mini-channels 181, 182, 183, 184 provides for selectively positioning a coupling member on the D-shaped shelf member to provide the capability of coupling the foot pedestal to a wall of a shower or bathtub.

Referring now to FIG. 7, a pedestal system 700 is shown according to one embodiment. In this embodiment, the system 700 includes a shelf member 108 as previously described, except that the interior portion of the shelf member 108 includes two collars (not illustrated) substantially maximally displaced from one another to accommodate first (102) and second (103) elongate beam members for providing additional stability. In this embodiment, each beam member 102, 103 includes a corresponding suction cup 112, 113, disposed on a distal portion, 134, 135, respectively. In this and other embodiments, each beam member 102, 103 can include slots spanning the elongate length configured to retain one or more attachment mechanisms, e.g., suction cups 173, 174. In this and other embodiments, the suction cups can be shifted up or down along the length of the beam member 102, 103 as desired and pressed against a shower or tub wall to reversibly fix the system 700 to a chosen location in the facility. Similarly, downward pressure on the system 700 can cause the two suction cups on the distal portions of beam members 102, 103 to reversibly fix to the floor.

In general, pedestal system of the type described herein can be configured to hold accessory items. For example, a pedestal system can include platforms or holders for retaining razors, soaps, lotions, creams, and the like.

In general, fastening mechanisms such as the disclosed suction cups can be, or can be configured to be rotatable in all degrees of freedom to accommodate various bath and shower configurations. For example, the transition from wall to floor in some bathtubs is arced and gradual; thus, a rotatable suction cup disposed on a pedestal system can be positioned such that it produces a strong seal against the wall or floor while maintaining the system in a preferred orientation.

Pedestal systems of the type described herein can be used for a variety of purposes. For example, a user can place their foot on the shelf member of a system, e.g., system 100, which can raise the leg into a position that allows easier access for functions like shaving. In one embodiment, the shelf member of a pedestal system, e.g., system 100, can be shifted vertically, e.g., along one or more elongate beam members, to accommodate users of various height. Likewise, in one embodiment, the vertically-oriented, elongate beam member can be formed of two or more slidably-coupled, elongate beam members, providing the capability to change the height of the shelf member, or the system in general.

A number of illustrative embodiments have been described. Nevertheless, it will be understood that various modifications may be made without departing from the spirit and scope of the various embodiments presented herein. For example, a pedestal systems are disclosed herein having one or two elongate beam members; however, it should be understood that such a system can include three, four, or any desired number of beam members for stability or other considerations. The elongate beam member 102 in any shower pedestal embodiment can be formed of two or more slidably engaged beam members to allow the beam member 102 to be elongated or shortened as desired. The disclosed pedestal systems can be assembled and disassembled as desired for use and storage, respectively. Accordingly, other embodiments are within the scope of the following claims.

What is claimed is:

1. A pedestal system, comprising:
    at least one vertically-oriented, elongate beam member coupled with a perpendicularly-coupled shelf member configured to receive the foot of a user; and
    one or more coupling mechanisms configured to reversibly couple at least one of said elongate beam member and said shelf member to a structural component of a bathtub or shower;
    wherein said elongate beam member comprises a first elongate slot along a first beam member facet configured for receiving one or more of said coupling members and providing selective placement thereof along said first elongate slot.

2. The system of claim 1, further comprising a second elongate slot along a second, different beam member facet configured for receiving one or more of said coupling members and providing selective placement thereof along said elongate second elongate slot.

3. The system of claim 1, wherein the angle between said first and said second beam member facets is substantially equivalent to the angle between said faceted portion and said flat rear portion of said D-shaped shelf member.

* * * * *